J. KRAKOWIECKI.
VEHICLE FRAME.
APPLICATION FILED DEC. 9, 1918.
1,319,653.
Patented Oct. 21, 1919.
2 SHEETS—SHEET 1.
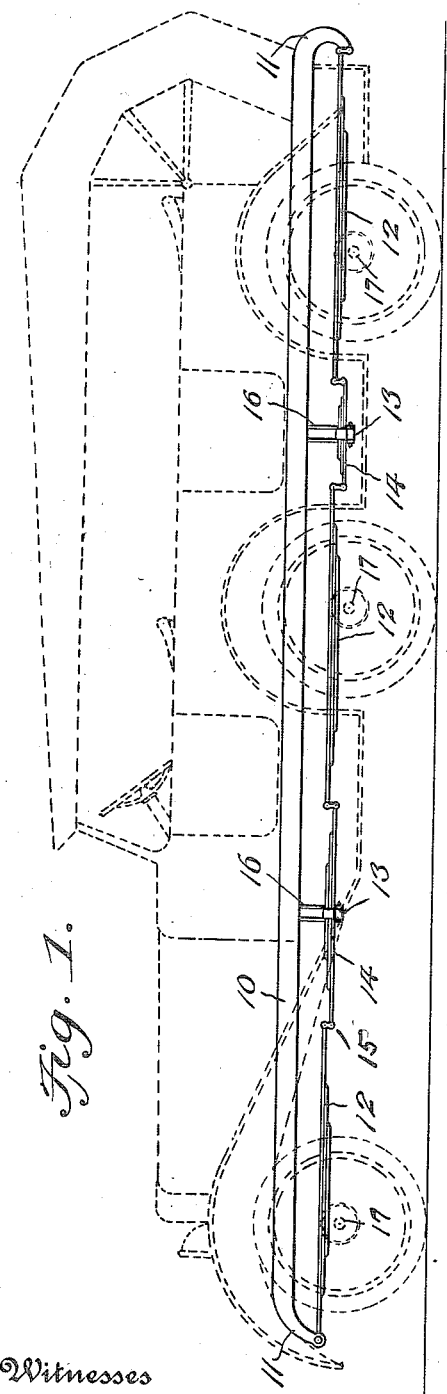
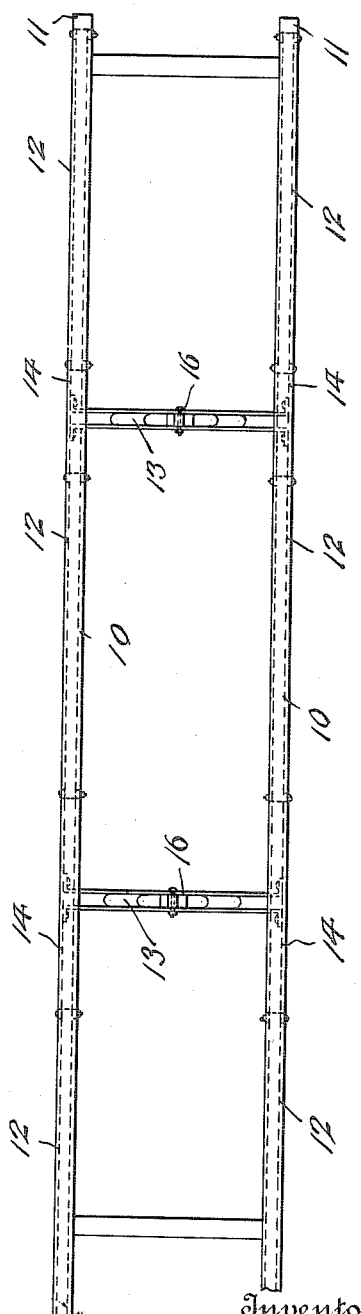
Witnesses
Frank B. Hoffman
Inventor
John Krakowiecki
By Victor J. Evans
Attorney J. KRAKOWIECKI.
VEHICLE FRAME.
APPLICATION FILED DEC. 9, 1918.
1,319,653.
Patented Oct. 21, 1919.
2 SHEETS—SHEET 2.
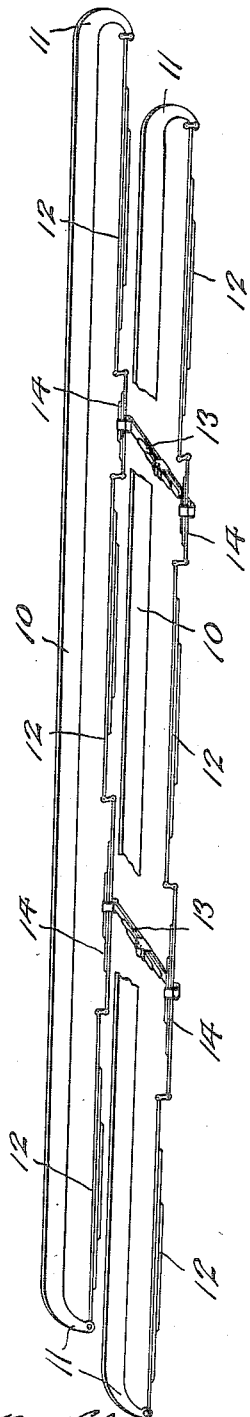
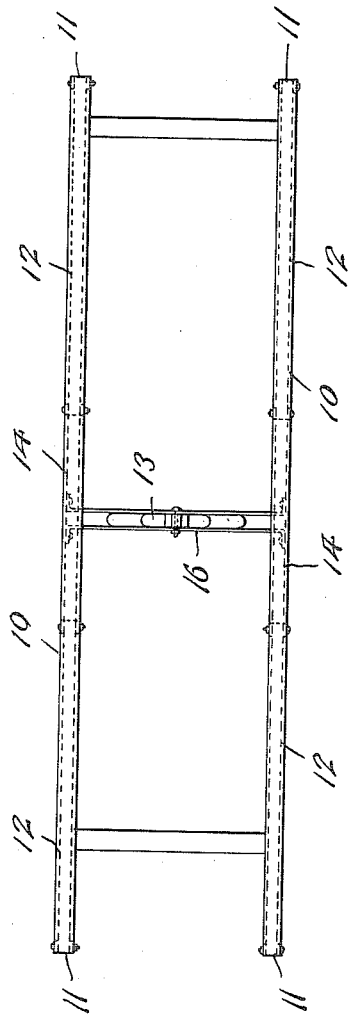
Inventor
John Krakowiecki
By Victor J. Evans
Attorney
Witnesses
Frank B. Hoffman

UNITED STATES PATENT OFFICE.

JOHN KRAKOWIECKI, OF KALISPELL, MONTANA.

VEHICLE-FRAME.

1,319,653. Specification of Letters Patent. Patented Oct. 21, 1919.

Application filed December 9, 1918. Serial No. 265,973.

*To all whom it may concern:*

Be it known that I, JOHN KRAKOWIECKI, a citizen of the United States, residing at Kalispell, in the county of Flathead and State of Montana, have invented new and useful Improvements in Vehicle-Frames, of which the following is a specification.

The object of the invention is to provide a vehicle as of the automobile type with a supporting spring structure by means of which the body may be held in a balanced condition with the load equalized and distributed and whereby shock and jars applied to the running gear at various points in the progress of the machine as by one or more of the wheels encountering an obstacle, will be cushioned and distributed so as to be practically negligible so far as any effect upon the body of the occupant thereof may be concerned; and incidentally to provide a suspending or supporting structure which so cushions even severe shocks due to rough and uneven roads as to minimize or eliminate damage to or straining of the vehicle.

Further objects and advantages of the invention will appear in the course of the following description of the preferred embodiment thereof, it being understood that changes in the form, proportion and details of construction may be resorted to within the scope of the appended claims without departing from the principles involved.

In the drawings:—

Figure 1 is a side view of an apparatus embodying the invention, the ordinary portions of the vehicle including the wheels and body being shown in dotted lines.

Fig. 2 is a plan view of the load supporting and distributing structure.

Fig. 3 is a perspective view of the same.

Fig. 4 is a plan view of the chassis when, as in the ordinary practice, only four wheels are employed, two of them being drivers.

In Figs. 1, 2 and 3 of the drawing the invention is shown applied to a vehicle of the automobile type wherein six wheels are employed, four of them being drivers to increase the tractive force or purchase upon the road and hence the driving power, said drivers constituting practically the entire support for the load represented by the body, the front or steering wheels being relieved almost entirely thereof, but it will be understood that the suspension mechanism forming the subject matter of the invention is equally applicable to vehicles having only four wheels of which two are drivers as in the ordinary practice as shown in Fig. 4, the only difference in the suspension means residing in a multiplication of certain of the elements when the apparatus is applied to a vehicle having more than the usual four wheels, and therefore a particular description, only, of the structure illustrated in Figs. 1, 2 and 3 will be necessary in this connection, although the same will read substantially on the form indicated in Fig. 4.

The longitudinal side beams 10 represent elements of the frame of the vehicle such as the side beams of the chassis and terminally connected with the drop ends 11 thereof are longitudinal side series of transversely resilient or spring elements 12 constituting the side members of the supporting structure which are transversely connected intermediately by cross members 13 which are also resilient and preferably consist of leaf springs which terminally bear cross heads 14 also consisting of leaf springs and having a transverse or vertical resilience, the terminals of said cross heads being connected by suspension links 15 or the equivalent thereof with the adjacent terminals of adjoining elements 12 of the side members. Said transverse elements 13 are preferably connected centrally with cross bars 16 which are secured to the side frame bars or beams 10, the transverse elements having a pivotal connection with the cross bars so that said elements are capable of a tilting or rocking movement relative to the frame structure.

The elements of the longitudinal side members are supported respectively by the axles 17 of the running gear and as the side beams 10 support the load, it may be said that the load is imposed terminally upon the remote extremities of the terminal elements of the longitudinal side members and intermediately upon the transverse elements which in turn are suspended from the inner or adjacent extremities of the elements of said side members, the said transverse elements having a rocking relation with the point of imposition of the load thereon and a flexible and resilient terminal connection with the proximate or adjacent extremities of the elements of the side supporting members.

The effect of this structure is to balance the load represented by the body and its contents and to so distribute and absorb jars or shocks applied to single wheels or pairs of wheels as to convey the same to the body as a unit rather than to any particular zone thereof. The body is therefore carried with its load in an easy comfortable riding movement regardless of the roughness or unevenness of the road surface which may be traversed, and at the same time the compensatory action of the various elements serve to relieve any particular portion of the running gear or frame of the car from localized shock and jars.

As indicated in each of the several essential elements of the structure including those of the longitudinal side members, the transverse member and the cross heads by which connection is made between the terminals of the transverse member and the extremities of the elements of the longitudinal members is transversely resilient in a vertical plane and consists of a leaf spring, those of the side members being designed to resist central or intermediate upward flexure while the transverse elements and cross heads are arranged to resist central or intermediate downward flexure. Also it will be observed that the transverse elements are tiltably or rockably mounted at the point of imposition of the load and are also capable of pivotal swinging movement horizontally to allow for any strain in that direction while the suspending links forming the connections between the terminals of the cross heads and the extremities of the elements of the side members allow a limited forward and rearward bodily movement of said cross heads.

Having described the invention I claim:—

1. A suspension load distributing structure for vehicle bodies having side longitudinal members consisting of terminally supporting series of axle supported elements and an intermediate transverse connecting member consisting of a resilient element connecting the adjacent terminals of the elements of the side members.

2. A suspension load distributing structure for vehicle bodies having side longitudinal members consisting of terminally supporting series of axle supported elements and an intermediate transverse connecting member consisting of a pivotal resilient element connecting the adjacent terminals of the elements of the side members.

3. A suspension load distributing structure for vehicle bodies having side longitudinal members consisting of terminally supporting series of axle supported elements and an intermediate transverse member connecting the adjacent terminals of the longitudinal members and consisting of a resilient element having terminal resilient cross heads suspended at their extremities by the adjacent terminals of the elements of the longitudinal members.

4. A suspension load distributing structure for vehicle bodies having side longitudinal members consisting of terminally load supporting series of spring axle supported elements and an intermediate transverse connecting member consisting of a pivotal resilient spring element having terminal resilient cross heads suspended at their extremities by the adjacent terminals of the elements of the longitudinal members.

5. A suspension load distributing structure for vehicle bodies having side longitudinal members consisting of series of spring axle supported elements and a transverse resilient element terminally connected with adjacent ends of the opposite longitudinal elements.

6. A suspension load distributing structure for vehicle bodies having side longitudinal members consisting of series of spring axle supported elements and a transverse member consisting of a resilient element terminally connected by resilient cross heads with adjacent ends of the opposite longitudinal elements.

7. A suspension load distributing structure for vehicle bodies having side longitudinal members consisting of series of axle supported elements and a transverse resilient element terminally connected with adjacent ends of the opposite longitudinal elements, the load being imposed upon the remote ends of the terminal elements of the longitudinal series and the centers of the transverse element and the latter having a rocking or tilting movement relative to the point of imposition of the load.

8. A suspension load distributing structure for vehicle bodies having side longitudinal members consisting of series of resilient axle supported elements and a transverse resilient element terminally connected by resilient cross heads with the adjacent ends of the opposite longitudinal elements, the load being imposed upon the remote ends of the terminal elements of the longitudinal series and the center of the transverse element, and the latter having a tilting movement relative to the point of imposition of the load thereon.

In testimony whereof I affix my signature

JOHN KRAKOWIECKI.